Figure 9:
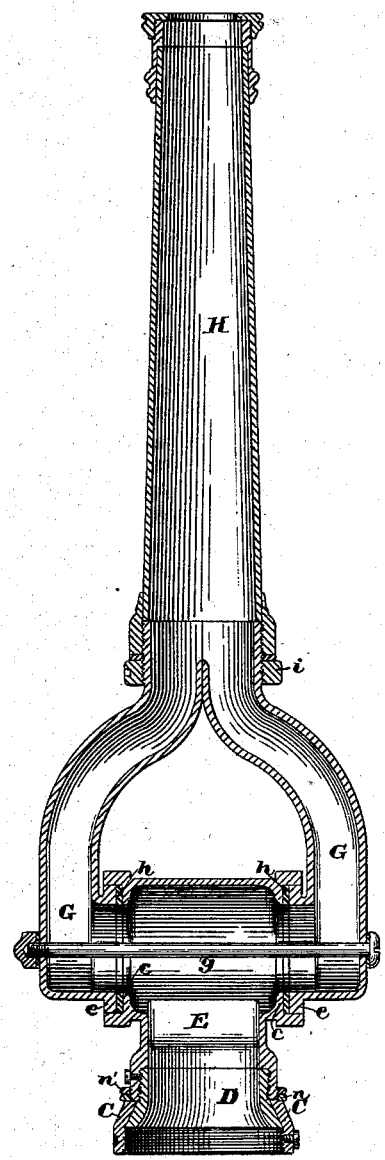

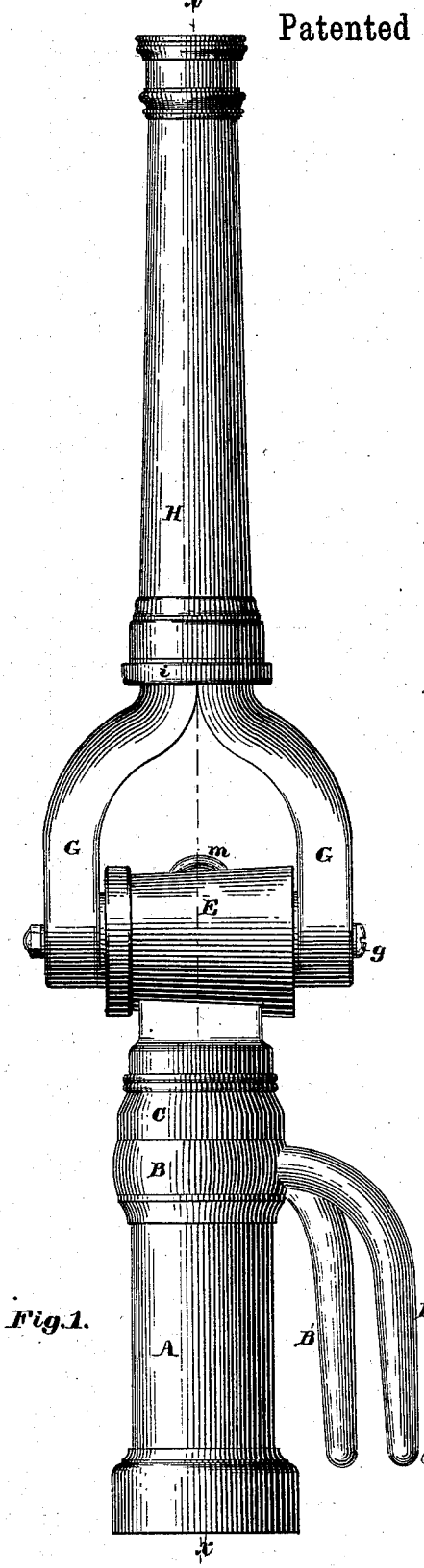

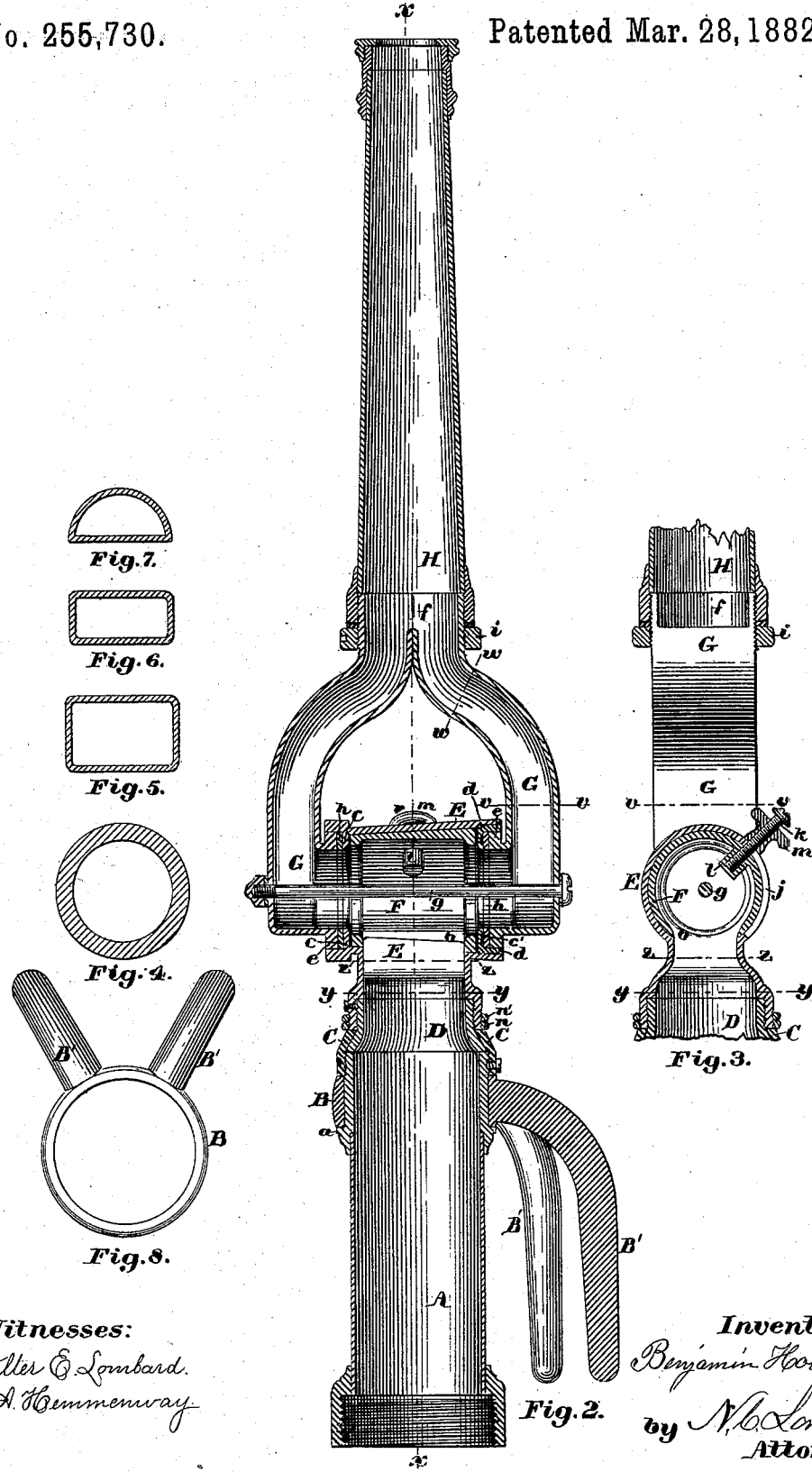

UNITED STATES PATENT OFFICE.

BENJAMIN HOLLAND, JR., OF NEWPORT, RHODE ISLAND, ASSIGNOR TO THOMAS S. NOWELL, TRUSTEE, OF BOSTON, MASSACHUSETTS.

HOSE-PIPE.

SPECIFICATION forming part of Letters Patent No. 255,730, dated March 28, 1882.

Application filed August 11, 1881. (No model.)

*To all whom it may concern:*

Be it known that I, BENJAMIN HOLLAND, Jr., of Newport, in the county of Newport and State of Rhode Island, have invented certain new and useful Improvements in Hose-Pipes, of which the following, taken in connection with the accompanying drawings, is a specification.

My invention relates to a discharge-pipe and joint for fire-engine, hose, and other pipes, which joint is designed especially for use at that end of the suction-hose that is to be coupled to the engine and at or near the discharge nozzle of the leading-hose, and the same is an improvement upon the joint patented to me July 1, 1879; and it consists, first, in the employment of a T-shaped pipe secured by the end of its upright arm to the hose, and provided in each end of its cross-arm with an inwardly-projecting collar or shoulder, in combination with two elbow branch pipes, each provided with a flange or other surface fitted to the chambered or enlarged end of said cross-arm and terminating at its opposite end in a semicircular outlet, said branch pipes being so shaped that when secured in position and clamped to the T-shaped pipe by a suitable clamping-bolt passing through the said branch pipes, with its axis coinciding with the axial line of the cross-arm of the T-shaped pipe, the opposite ends of said branch pipes will fit together, so as to form a complete circular outlet, in which position they are secured by means of a coupling-ring screwed onto their exterior surfaces.

It further consists in the combination, with a hose or other pipe, of a T-shaped pipe coupled to said hose or other pipe by means of a conical swiveling coupling-joint, two curved branch pipes connected by a pivotal joint to the cross-arm of the T-shaped pipe, one at each end, and secured together at their opposite ends by a female coupling or binding ring, so as to form a single circular outlet, said branch pipes being so arranged that they may be turned about their pivotal connection to the T-pipe to any desired angle, as will be described.

It further consists in the combination, with a hose or other pipe, of a T-shaped pipe-section, two curved branch pipes pivoted, one to each end of the cross-arm of said T-section, and united at their opposite ends to form a single circular passage, and a hollow frusto-conical valve located within the cross-arm of the T-section and adapted to be rotated therein, to let on or shut off the water or other fluid.

It further consists in the combination, with a hose or other pipe, of a T-shaped pipe-section, two curved branch pipes, pivoted, one to each end of the cross-arm of the T-section, and united at their opposite ends to form a single circular passage, a hollow tapering or frusto-conical valve fitted to the interior of said cross-arm of the T-section, and adapted to open or close the passage through said pipe-section, a slot formed in the wall of the cross-arm of said T-section and extending circumferentially partially around said cross-arm, a handle passing through said slot and attached to said valve as a means of turning it about its axis, and a check-nut working upon a screw-thread formed upon said handle and adapted to be operated by the thumb and fingers of the operator to securely bind or fasten the valve in the desired position, whether open or shut, as will be further described.

It further consists of a swiveling-ring provided with one or more hook-shaped horns or prongs surrounding a hose butt or pipe as a means of supporting a hose upon a ladder by engaging with a rung of the ladder, and for other purposes which will be hereinafter referred to.

Figure 1 of the drawings is an elevation of my improved hose-pipe and joint. Fig. 2 is a central vertical section, viewed from the same standpoint as Fig. 1. Fig. 3 is a partial section on line *x x* on Figs. 1 and 2. Fig. 4 is a section on line *y y* on Figs. 2 and 3. Fig. 5 is a transverse section on line *z z* on Figs. 2 and 3. Fig. 6 is a similar section on line *v v* on Figs. 2 and 3. Fig. 7 is a similar section through one of the curved pipes on line *w w* on Fig. 2. Fig. 8 is a plan of the swiveling-hook carrying ring; and Fig. 9 is a partial central vertical section, illustrating a modification, in which the shut-off valve is dispensed with.

A is a section of metallic pipe, which may be of greater or less length than shown in the drawings, as may be desired, and is provided at one end with a female screw-thread as a means of coupling said section to the hose or other pipe, and at or near its other end with the shoulder or collar *a*, a smooth cylindrical bearing-surface to receive the ring B, and a male screw-thread to receive the frusto-conical coupling-ring C, the conical portion of which embraces and forms a water-tight swiveling-joint with a correspondingly-shaped ring, D, which is screwed into the base of the T-shaped pipe-section E, as shown in Fig. 2. The cross-arm of the T-section E is made somewhat larger in diameter at one end than at a point near its other end, so as to form a frusto-conical interior chamber, in which is fitted the frusto-conical tubular valve F, open at each end, and having a peripheral opening, b, which corresponds in shape to the cross-section of the opening through the central branch of the T-section into the chamber of the cross-arm.

The cross-arm of the T-section has cast therein, near one end, the inwardly-projecting annular flange c, and has screwed into its other end the ring d, which has formed on its inner end the inwardly-projecting annular flange c'.

G G are two curved elbow-pipes, each provided at one end with the flange e, and so shaped at its other end that when said pipes are placed in position the two pipes unite to form a single circular passage, as at f. The pipes G G are secured to the cross-arm of the T-shaped pipe-section E by means of the bolt g, which is so located that its axis coincides with the axis of the cross-arm of the T-section and with the centers of the flanges e e of the pipes G G, said flanges being turned to fit, one to the interior of the ring d and the other to the short cylindrical section of said cross-arm that is outside of the inwardly-projecting collar or flange c, the inner faces of the flanges e e being pressed by the bolt g upon the packing-rings h, interposed between said flanges and the flanges c and c', as shown in Fig. 2. The semi-cylindrical ends of the pipes G G are firmly secured together by the ring-nut i, fitted upon a male screw-thread formed upon said pipes, which thread also serves for securing the discharge-nozzle H or another section of hose, as may be desired.

A slot, j, is cut through the wall of the cross-arm of the T-section E, the length of which extends circumferentially around the periphery thereof a distance about equal to ninety degrees, through which the screw k is screwed into the periphery of the valve F, a boss, l, being cast upon the interior of said valve to give more length of thread for securing said screw firmly in position.

Upon the screw k is fitted the thumb-nut m, which serves, by pressing upon the exterior of the T-section, to clamp the valve F in the desired position, whether open or shut, and prevent it from being accidentally displaced.

The ring B has cast thereon the two hook-shaped horns B' B', which are used to engage with the rungs of a ladder, and thus support the weight of the hose when the firemen are obliged to play from a ladder. Another advantage of the use of the horns B' B' is that in cases where the firemen are obliged to lie upon the floor of a room filled with dense smoke in order to see how to direct the stream upon the fire, the horns will support the pipe sufficiently raised above the floor to permit the free movement of the nozzle in any direction, which the hoseman is enabled to do by moving said nozzle about the axial bolt g, while at the same time the T-section, to which said nozzle is pivoted, may be swiveled in the frusto-conical coupling-ring C.

The frusto-conical rings C and D are fitted together by a ground joint, and are nicely adjusted to each other by means of nut n and check-nut n', so that while the joint between the two rings is water-tight one may be moved within the other in order to enable the nozzle H to be turned in any desired direction. The valve F is also fitted to the interior of the cross-arm of the T-section by a ground joint in the same manner as a plug-cock.

In the modification shown in Fig. 9 the valve F and the ring d are dispensed with, the cross-arm of the T-section being made alike at both ends, by which a saving in cost is made, and for some purposes the joint is all that is required without the valve.

What I claim as new, and desire to secure by Letters Patent of the United States, is—

1. In combination with a hose or other pipe, the T-shaped section E, provided with a screw-thread for securing it to the hose or other pipe, and an inwardly-projecting annular lip or flange in each end, the two curved branch elbow-pipes G G, the axial pivot-bolt g, and the clamping-nut i, all constructed, arranged, and adapted to operate substantially as described.

2. The combination of the pipe or coupling section A, the T-section E, the frusto-conical coupling-rings C and D, the two curved branch elbow-pipes G G, the pivotal bolt g, and the clamping ring-nut i, all constructed, arranged, and adapted to operate substantially as and for the purposes described.

3. The combination of the pipe or coupling section A, the frusto-conical rings C and D, the T-shaped pipe-section E, the hollow frusto-conical valve F, the two curved elbow-pipes G G, the clamping pivot-bolt g, and the ring-nut i, all arranged and adapted to operate substantially as described.

4. The combination of the pipe or coupling A, the T-shaped pipe-section E, provided with the circumferential slot j, the frusto-conical valve F, the curved elbow-pipes G G, the ring-nut i, the screw-handle k, and the thumb-nut m, substantially as described.

5. In combination with a hose-pipe or butt, the hook-shaped horns B', attached permanently thereto, substantially as and for the purposes described.

6. In combination with a hose pipe or butt, the swiveling-ring B, provided with one or more hook-shaped horns, B', all arranged and adapted to operate substantially as and for the purposes described.

7. The combination of the pipe or coupling section A, the swiveling-ring B, provided with one or more hook-shaped horns, B', the frusto-conical coupling-rings C and D, the T-shaped pipe-section E, the curved elbow-pipes G G, the pivot-bolt g, and the ring-nut i, all arranged and adapted to operate substantially as described.

8 The combination of the pipe or coupling section A, the swiveling-ring B, provided with one or more hook-shaped horns, B', the frusto-conical rings C and D, the T-shaped pipe-section E, provided with the slot j, the frusto-conical valve F, the two curved elbow branch pipes G G, the pivotal binding-bolt g, the ring-nut i, the valve-screw handle k, and the thumb-nut m, all arranged and adapted to operate substantially as and for the purposes described.

Executed at Boston, Massachusetts, this 9th day of August, A. D. 1881.

BENJAMIN HOLLAND, JR.

Witnesses:
  E. A. HEMMENWAY,
  WALTER E. LOMBARD.